United States Patent
Nuyts

(12) United States Patent (10) Patent No.: US 7,528,329 B2
Nuyts (45) Date of Patent: May 5, 2009

(54) WEIGHING DEVICE WITH LIFT-AND PUT DOWN FUNCTION

(76) Inventor: Ludovicus C. M. Nuyts, Steenweg op Turnhout 137, Oud-Turnhout (BE) B-2360

( * ) Notice: Subject to any disclaimer, the term of this patent is extended or adjusted under 35 U.S.C. 154(b) by 254 days.

(21) Appl. No.: 10/597,048

(22) PCT Filed: Jan. 7, 2005

(86) PCT No.: PCT/BE2005/000002

§ 371 (c)(1),
(2), (4) Date: Jul. 10, 2006

(87) PCT Pub. No.: WO2005/066593

PCT Pub. Date: Jul. 21, 2005

(65) Prior Publication Data

US 2008/0121440 A1 May 29, 2008

(30) Foreign Application Priority Data

Jan. 9, 2004 (BE) .................................. 2004/0012
Jun. 1, 2004 (BE) .................................. 2004/0271

(51) Int. Cl.
*G01G 19/08* (2006.01)
(52) U.S. Cl. .................... 177/136; 177/141; 177/146
(58) Field of Classification Search ............ 177/136, 177/141, 146
See application file for complete search history.

(56) References Cited

U.S. PATENT DOCUMENTS

| 3,545,558 | A | * | 12/1970 | Maugh ...................... 177/208 |
| 3,587,760 | A | * | 6/1971 | Puhringer et al. ........... 177/141 |
| 5,174,404 | A | | 12/1992 | Nuyts |
| 5,369,222 | A | * | 11/1994 | Strelioff ...................... 177/136 |
| 5,393,936 | A | * | 2/1995 | Tyhy et al. ................... 177/138 |
| 5,635,680 | A | * | 6/1997 | Dojan .......................... 177/136 |
| 5,773,768 | A | | 6/1998 | Nuyts et al. |
| 5,789,714 | A | * | 8/1998 | Doerksen ..................... 177/141 |

\* cited by examiner

*Primary Examiner*—Randy W Gibson
(74) *Attorney, Agent, or Firm*—Brooks Kushman P.C.

(57) ABSTRACT

A weighing system contains 1 or more weighing elements (2). The weight of the receptor/superstructure (4) with or without a load is borne by the weighing element(s) (2). At least 1 weighing elements (2) is connected with 2 fasteners (3), with one positioned in the connection between one fastening end (6) of the weighing (element2) and the framework/chassis (5) and with the other positioned in the connection between the other fastening end (7) of the weighing element (2) and the receptor/superstructure (4). At least 1 weighing element (2) is partly or entirely positioned with at least 1 of its fastening ends (6)(7) in the space between its 2 fasteners (3), with the characteristic that the weighing system has a device (1) which can lift the receptor/superstructure (4) from the framework/chassis (5) and which can deposit the receptor/superstructure (4) back on the framework/chassis (5) after weighing. The weighing system can also be manufactured and applied as on-board weighing on vehicles.

7 Claims, 1 Drawing Sheet

WEIGHING DEVICE WITH LIFT-AND PUT DOWN FUNCTION

Figure 1:
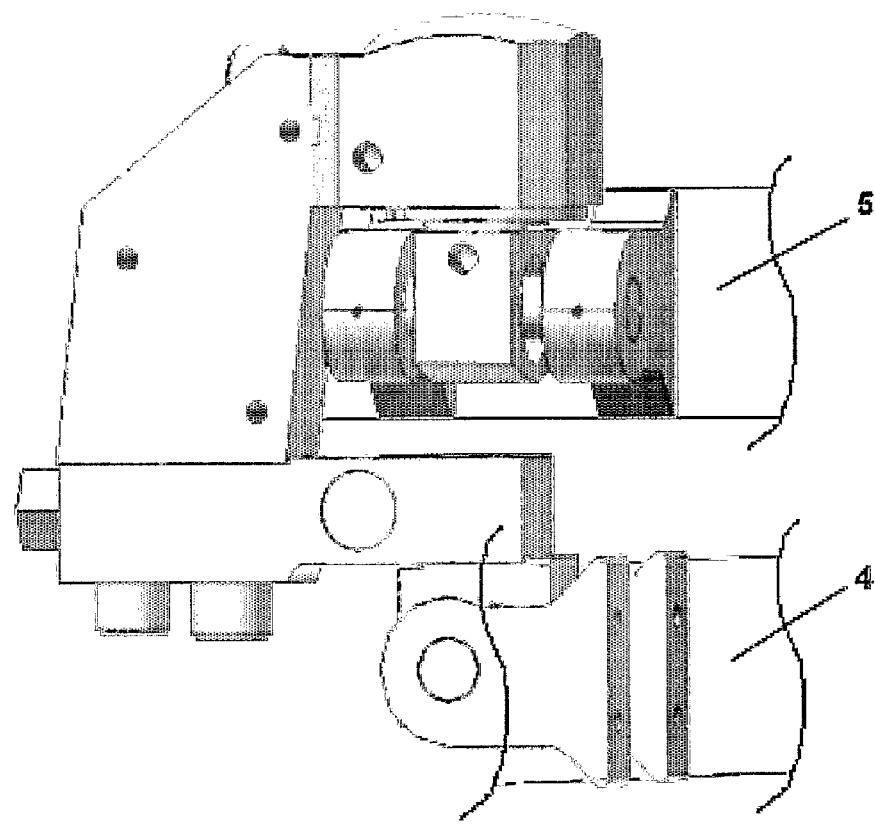

Weighing systems, such as on-board weighing systems on vehicles, with integrated weighing elements (2) (loadcells), have been well known for many years now. The well-known principles of on-board weighing mainly fall into 2 main groups:

I) On-Board Weighing System with Fixed Weighing Elements

This system is usually fixed, to the chassis on the one hand and to the superstructure on the other hand. The weighing elements, which measure the forces exerted thereon and possibly convert them into digital measurement values by means of additional equipment, always bear a load, when the vehicle is both moving and stationary.

Because the necessary distance is always ensured between the superstructure and chassis, the superstructure and chassis do not come into contact, except for the contact via the weighing elements. If they should come into contact, forces from the superstructure and its load would be transmitted to the chassis, without being measured via the weighing elements. As a consequence, this would interfere with the correctness of the weighing. In order to make this principle sufficiently sustainable and sufficiently accurate for legal calibration and legal for trade purposes, the weighing elements are necessarily oversized, in order to be able to resist shocks and vibrations while moving and their signals or results are usually corrected or compensated, automatically or otherwise, for inaccuracies due to tilting of the vehicle. The main disadvantage of these systems is that, due to oversizing of the weighing elements and under the influence of possible tilting of the vehicle, a great deal of accuracy is lost. Another disadvantage is worth mentioning: as few as possible load introductions are applied, usually only 4, with a view to achieving the best possible weighing results.

It is well-known that the use of more than 4 load introductions, because of sometimes uncontrollable stresses due to e.g. torsion in the vehicle, has an adverse effect on precision. If 4 load introductions are applied, however, the forces in the chassis and in the superstructure have a very concentrated effect. In addition, these forces may be extremely high with a moving vehicle, on rugged terrain and in a loaded condition, because of dynamic circumstances. If vehicles are built under such concessions, the causal connection with premature crack formation in the chassis and/or the superstructure is usually self-evident.

II) On-Board Weighing System with Gimballed Weighing Elements a) With a Hydraulic, Horizontally Acting Locking System:

Example: U.S. Pat. No. 5,773,768 FIG. 18 and FIG. 19

The body is gimballed, with integrated weighing elements (2), on points that are fixed to the chassis and usually protrude from it. Because of the instability of the gimballed weighing principle, the chassis and superstructure are stabilised vis-à-vis each other, while the vehicle is moving, usually by means of horizontal hydraulic, conical locks. This situation allows for a permanent play between the superstructure and chassis. The forces introduced via the gimballed weighing elements (2) are partially taken over by the hydraulic locks in case of a moving vehicle. With this concept the high concentration of forces usually continues to apply adversely. In order to attempt to eliminate these disadvantages, a greater number of hydraulic locks may have to be provided than the 4 weighing elements (2). The high concentration of dynamic forces are then distributed more while driving. This may result in an advantageous high precision because of the fact that the weighing elements (2) mounted in gimballed suspensions are not affected by the tilting of the vehicle on the one hand, and the fact that the weighing elements, relieved by means of hydraulic locks and only loaded in case of a stationary vehicle, do not have to be oversized on the other hand. The additional installation of hydraulic locks, however, will significantly increase the weighing system's cost. In addition, a higher own weight of the vehicle will result in additional loss of loading capacity.

The construction must include supports to cope with the load introductions. These load introductions, consisting of gimballed suspensions with integrated weighing elements (2), are borne by the supports of the construction. The construction must also include supports for the hydraulic locks.

To obtain an as precise as possible weighing, it is important for weighing technology reasons that the combined centre of gravity of the superstructure with its content is always positioned as far as possible in front of the rear weighing elements. It must be noted that, especially with vehicles fitted with a superstructure and rear loading for the loading and pressing of waste, these usually have a significant overhang over the rear of the chassis.

To obtain the most favourable position of the centre of gravity of the superstructure with its load, it is of the utmost importance that the rear weighing elements (2) are placed as far as possible to the rear of the chassis. For equally important technical reasons and particularly because of the protection of the rear weighing element (2), the locking system is best positioned behind the last weighing element (2). After all, the rear weighing elements (2) are then relieved the most while the vehicle is in motion.

The necessary position, as far back as possible, of both the rear weighing elements (2) and the locking system, results in a technical dilemma, necessitating concessions. This type of concessions usually harm the quality of a product.

All this leads to the conclusion that this type of applications is rather laborious and it appears difficult to achieve a construction that can be applied without change to a variety of vehicles (standard). The system may be quite good with regard to weighing technology, but may have a very roundabout construction, necessitating a highly technical study and assistance with each vehicle that will be built, in an attempt to avoid serious errors. The least negligence or leaving the construction to a builder may have serious consequences and makes the system very expensive in most circumstances, with regard to both manufacture and assembly. Under these circumstances large-scale application is probably not feasible.

Three types can be distinguished with regard to the above-mentioned principle, involving weighing elements with integrated gimballed suspensions:

1) The weighing element (2) is located outside the space between the 2 gimbal points. (EP 0 476 778 B1)
2) The weighing element (2) is located in the space between the 2 gimbal points. (BE-2001/0470)
3) The weighing element (2) is located in one of the 2 gimbal points. (BE-2001/0470)

b) With a Hydraulic Lifting and Depositing System:

The EP 0 476 778 B1 patent, providing for a suspension whereby the weighing element (load indicator) is positioned outside the space between the 2 gimbal points, as mentioned in its conclusion 1, provides for two suspension principles in its conclusion 6, with a hydraulic cylinder.

A lifting and depositing principle, combined each time with a suspension in accordance with the main conclusion, whereby the weighing element is positioned outside the space between the 2 gimbal points, already indicates in this patent that this may be an interesting weighing possibility. Since the manufacturer, who is at the basis of this patent, has never applied the principle, this confirms the view that the principle of "hydraulic lifting and depositing", a well-known method at that time, was difficult to achieve. It can indeed be said that the possible result, i.e. "hydraulic lifting and depositing", may have been pursued as an option in the patent in question. The combination with the main conclusion, as a method, was not the ideal solution to implement, however.

The invention is thus aimed at a system with a simple construction, which can lower the receptor/superstructure (4) a few centimetres before the vehicle starts to move. As a result, the receptor/superstructure (4) lie over a large part of its length, directly on the framework/chassis (5), possibly via aids and/or a subframe. Mainly while driving on rugged terrain, optimally distributed high dynamic load introductions such as these, between the framework/chassis (5) and the receptor/superstructure (4), guarantee the prevention of crack formation in the general construction of the vehicle.

While the vehicle is standing still, for weighing, the devices (1) (8) are also capable of lifting the receptor/superstructure (4) somewhat (approx. 30 mm), so that it is only borne via static, not extremely high or uncontrollable load introductions. The load introductions existing at that time contain gimballed weighing elements (2), combined with integrated lifting devices (1)(8). Vehicles fitted with a receptor/superstructure (4) with rear loading for the loading and pressing of waste, are usually built far over the rear of the framework/chassis (5). To obtain the most favourable position of the centre of gravity of the receptor/superstructure (4) with a load, it is of the utmost importance that the rear weighing elements (2) are placed as far back as possible on the framework/chassis (5). In other words, the highest possible precise weighing must always be pursued, so that it is important for weighing technology reasons to keep the combined centre of gravity of the receptor/superstructure (4) with its content as much as possible in front of the rear weighing elements (2) at all times.

As the system combines a gimballed weighing element (2) with a lifting device (1)(8) and because both are located in the same load introduction, the possibility indeed exists to place the weighing element (2) as far as possible to the rear. As the receptor/superstructure (4) is deposited on the framework/chassis (5) while moving, there is no danger of damage to the rear weighing elements (2). This results in a most favourable position of the rear weighing elements (2) vis-à-vis the centre of gravity of the receptor/superstructure (4) with its load. No technical concessions need to be made. The system is easier to manufacture and assemble. It can be installed as a standard feature on any vehicle.

Concretely, the invention provides for: A weighing system with 1 or more weighing elements (2), whereby the weight of the receptor/superstructure (4) with or without a load is borne by the weighing element(s) (2), at least 1 weighing element (2) is connected to 2 fasteners (3), with one positioned in the connection between one fastening end (7) of the weighing element (2) and the framework/chassis (5) and the other positioned in the connection between the other fastening end (6) of the weighing element (2) and the receptor/superstructure (4), at least 1 weighing element (2) with at least 1 of its fastening ends (6)(7) entirely or partly positioned in the space between its 2 fasteners (3). characterized in that the weighing system contains a device (1) which can lift the receptor/superstructure (4) for weighing and which can deposit the receptor/superstructure (4) after weighing.

In addition to several other conclusions, the invention also provides for replacement of the weighing elements (2) by connections of the same or about the same form as the weighing elements (2), but not with the same function.

The connections can be called false weighing elements. In this case the pressure is measured in the hydraulic drive of the lifting device (1) (8) and converted into weight. Ordinarily, this is a less precise weighing, but it may be a useful and more price-favourable option.

LEGEND

Figure 2:
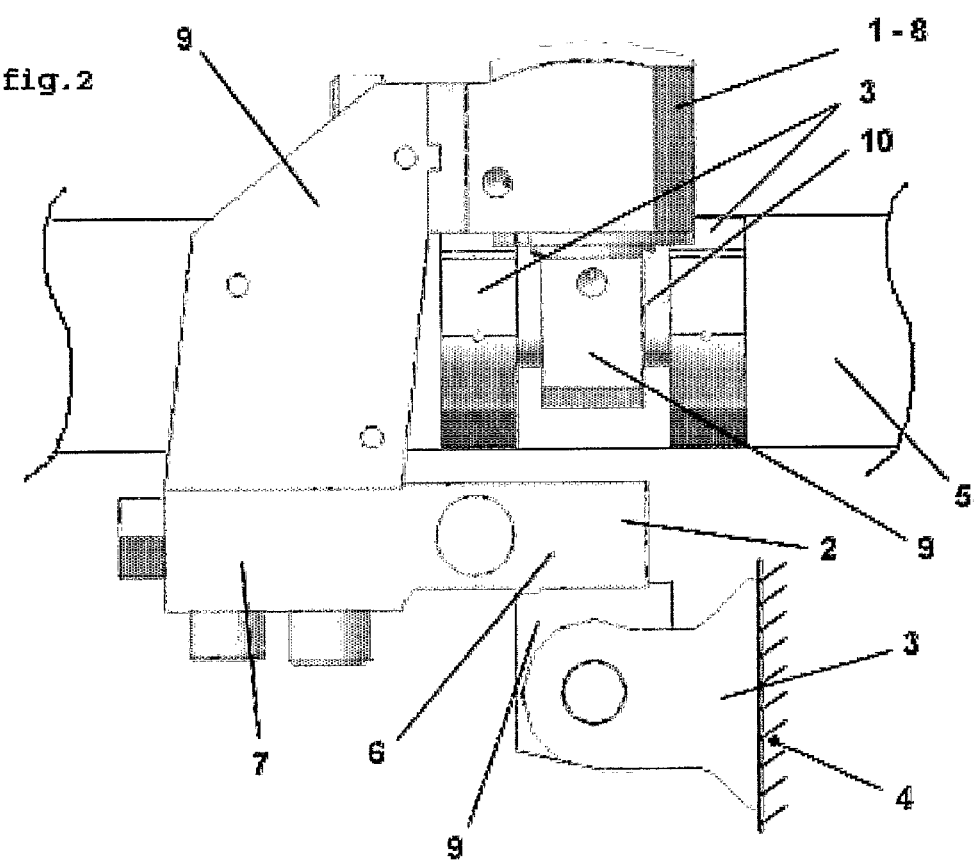

1 Lifting/depositing device
2 Weighing element (loadcell)
3 Fastener
4 Receptor/Superstructure
5 Framework/Chassis
6 Fastening end of a weighing element (2)
7 Fastening end of a weighing element (2)
8 Leverage
9 Connection of a weighing element (2) and a fastener (3) with a universal joint in it (10).
10 Universal joint FIG. 1 and FIG. 2 show a weighing element assembly as it is mounted on the framework/chassis (5) and on the receptor/superstructure (4).

The framework/chassis (5) and the receptor/superstructure (4) are not detailed in the drawings in FIG. 1 and FIG. 2.

The invention claimed is:

1. Weighing system for weighing a receptor/superstructure with or without a load comprising one or more weighing elements for bearing the weight of the receptor/superstructure with or without a load, at least one weighing element having two fastening ends and being securely connected with two fasteners respectively to the receptor/superstructure and to a framework/chassis, whereby one fastener is positioned in the connection between one fastening end of the weighing element and the framework/chassis while the other fastener is positioned in the connection between the other fastening end of the weighing element and the receptor/superstructure, the weighing system having a lifting cylinder, which can life the receptor/superstructure from the framework/chassis for weighing and that can deposit the receptor/superstructure on the framework/chassis after weighing, characterized in that the lifting cylinder connects one of the fastening ends of the weighing element and the associated fastener.

2. Weighing system according to claim 1, characterized in that the weighing system is an on-board weighing system mounted on a vehicle between the chassis and the superstructure of the vehicle.

3. Weighing system according to claim 1, characterized in that the lifting cylinder is positioned in such a manner that the distance between the two fasteners, belonging to the same weighing element, is increased or decreased, respectively, in case of a coming and going movement of the lifting cylinder.

4. Weighing system according to claim 1, characterized in that the lifting cylinder is a hydraulic cylinder and that the pressure in the cylinder is measured in order to be converted into a weight, the lifting cylinder thus also being the weighing element.

5. Weighing system according to claim 1, characterized in that each of the fasteners belonging to one weighing element is fixed, one to the receptor/superstructure and the other to the framework/chassis, on the one hand and in that each of the fasteners has a connection, via a universal joint, one to one of the fastening ends of that weighing element and the other to the other fastening end of that weighing element, on the other hand.

6. Weighing system according to claim 1, characterized in that at least one weighing element with at least one of its fastening ends is entirely or partly positioned in the space between its two fasteners.

7. Weighing system according to claim 1, characterized in that the lifting/depositing device is at least partly located between the two fasteners.

* * * * *